United States Patent [19]

Anjan et al.

[11] Patent Number: 5,263,104
[45] Date of Patent: Nov. 16, 1993

[54] OPTICAL FIBER DIRECTIONAL COUPLER HOUSING

[76] Inventors: Yellapu Anjan, 8368 E. San Rosendo Dr., Scottsdale, Ariz. 85258; Sam Habbel, 6709 E. Sandra Ter., Scottsdale, Ariz. 85254; Joseph F. Straceski, 19219 N. 33rd Dr., Phoenix, Ariz. 85027; Karl A. Fetting, 3638 W. Camino Real, Glendale, Ariz. 85310

[21] Appl. No.: 799,598

[22] Filed: Nov. 27, 1991

[51] Int. Cl.$^5$ .............................................. G02B 6/26
[52] U.S. Cl. .......................................... 385/51; 385/42
[58] Field of Search ........................ 385/15, 21, 22, 23, 385/41, 42, 134, 135, 137, 51

[56] References Cited

U.S. PATENT DOCUMENTS

| 4,474,431 | 10/1984 | Bricheno | 385/42 X |
|---|---|---|---|
| 4,482,203 | 11/1984 | Stowe et al. | 350/96.15 |
| 4,714,316 | 12/1987 | Moore et al. | 350/96.20 |
| 4,753,497 | 6/1988 | Fujii et al. | 385/42 |
| 4,801,185 | 1/1989 | Bricheno | 350/96.15 |
| 4,932,740 | 6/1990 | Berkey et al. | 350/96.15 |
| 4,992,122 | 2/1991 | Rayit | 156/158 |
| 4,997,247 | 3/1991 | Stowe | 350/96.15 |
| 5,148,508 | 9/1992 | Anjan et al. | 385/51 |

FOREIGN PATENT DOCUMENTS

| 0106116 | 4/1984 | European Pat. Off. | 385/51 |
|---|---|---|---|
| 0124927 | 11/1984 | European Pat. Off. | 385/51 |
| 0343588 | 11/1989 | European Pat. Off. | 385/51 |

*Primary Examiner*—John D. Lee
*Assistant Examiner*—Phan Thi Heartney
*Attorney, Agent, or Firm*—Mark J. Gebhardt; George A. Leone, Sr.

[57] ABSTRACT

An optical fiber directional coupler housing having a primary protective body substantially formed as a rectangular block with a receiving space therein. A slot in the primary protective body provides the receiving space therein. The coupled portion of the coupler to be housed is positioned in the receiving space. A resilient support material having an index of refraction less than that of the coupled portion extends into the receiving space extending between the coupled portion of the coupler which it also at least partially surrounds and the primary protective body. Plugs are typically provided at the ends of the protective body to secure the optical fibers extending from the coupled portion to the body. A heat shrinkable tubing is used as a jacket which encompasses and extends beyond the primary body.

14 Claims, 3 Drawing Sheets

OPTICAL FIBER DIRECTIONAL COUPLER HOUSING

BACKGROUND OF THE INVENTION

The present invention relates generally to a housing for an optical coupler and, more particularly, to a housing for an optical fiber directional coupler.

An optical fiber directional coupler is used in optical fiber interconnection arrangements to couple electromagnetic waves from one of two or more optical fibers to another fiber in the group (alternatively, to couple one optical fiber to itself to form a loop). Such couplers have been used in optical communications, optical sensors, and fiber-optic gyros. One example is an optical fiber directional coupler formed by fusing and tapering two or more polarization maintaining optical fibers together. Fabrication of such a coupler generally involves aligning the principal birefringent axes of two or more polarization maintaining fibers, bringing them together, followed by heating those fibers to fuse and taper the fibers resulting in a fused and tapered region for coupling of optical power.

One type of polarization maintaining fiber includes a pair of stress applying parts having an optical core positioned parallel to, and between those parts. A glass cladding encases the stress applying parts and the optical core therein, with the cladding covered by a protective polymer jacket. The cladding must have an index of refraction less than that of the optical core to maintain total internal reflection within the core. The stress applying parts of the polarization maintaining fiber must have an index of refraction matched with that of the cladding to less than 0.2% of the cladding index in order to avoid higher order mode, or higher reflection angle, coupling. The cladding diameter must be small so that low loss and small sized coupler packages can be realized.

The stress applying parts create birefringent axes, a first principal axis and a second principal axis, along the fiber. Typically, the second principal axis is the intersection with a cross section of a fiber of a surface passing through the pair of stress applying parts and the optical core, and along which a propagating wave travels relatively slowly. The first principal axis, or fast axis, is rotated by 90° with respect to the second principal, or slow axis, but also intersects with optical core. These axes can be identified by viewing a cross-section of the fiber under a microscope. Maintaining polarization in electromagnetic waves propagating through a coupler typically requires close alignment of the birefringent axes of the joined fibers.

The optical signal processing performance of an optical fiber directional coupler in various environments typically depends upon the type of housing in which it is positioned for protection, and on the methods used to assemble the housed coupling. In a fused optical directional coupler, for instance, the fused and tapered portions of the coupler where the transfer of optical power takes place are structurally weak and sensitive to environmental conditions. The materials used in the housing for such a coupler must have thermal expansion properties as close as possible to the thermal expansion properties of the fused silica used in the making of optical fibers. The polarization extinction ratio and the transmissibility of the coupler can be degraded if the materials used in the housing subject the fibers to a non-uniform distribution of stresses either during the fabrication process, or thereafter during use due to changes in the environmental conditions in which it is used.

Quartz glass tubes have been used as a protective covering, and as a support, for the coupled portion in a fused optical coupler formed in a jacketless region of optical fibers. In such an arrangement, the coupled region is typically placed within the slotted quartz glass tube and epoxy is applied at the ends of the tubes to secure the optical fibers extending therefrom, and so the coupler, to the tube. However, difficulties arise in environments in which substantial shock or vibration occurs because of the resulting material movements of the coupled portion of the coupler suspended in the central open portion of the tube.

This problem has in part been overcome by placing the fibers within the bore of such a glass tube and then heating the mid region of the tube so assembled until it collapses about the fibers followed by stretching the tube to reduce the diameter thereof. This method places the glass tube in direct contact with the optical fibers and the coupled portion of the coupler, thereby providing rigid support to the coupled region. This, however, places stress on the coupler causing losses and other difficulties. Similar stresses arise in a coupler formed by placing two optical fibers between a pair of glass substrates forcing the fiber together at the coupled region through a direct contact with the substrates, thus forming rigid support for the coupled portion of the coupler. Therefore, an improved housing for optical fiber directional couplers is desired.

SUMMARY OF THE INVENTION

In contrast to the prior art, the present invention provides an optical coupler which is more robust, easier to handle and which avoids breakage of fibers at strain relief points. The present invention provides an optical fiber directional coupler housing having a primary protective body substantially formed as a rectangular block with a receiving space therein. A slot in the primary protective body provides the receiving space therein. The coupled portion of the coupler to be housed is positioned in the receiving space. A resilient support material having an index of refraction less than that of the coupled portion extends into the receiving space extending between the coupled portion of the coupler which it also at least partially surrounds and the primary protective body. Plugs are typically provided at the ends of the protective body to secure the optical fibers extending from the coupled portion to the body. A heat shrinkable tubing is used as a jacket which encompasses and extends beyond the primary body.

DETAILED DESCRIPTION OF THE PREFERRED EMBODIMENT

Figure 1:
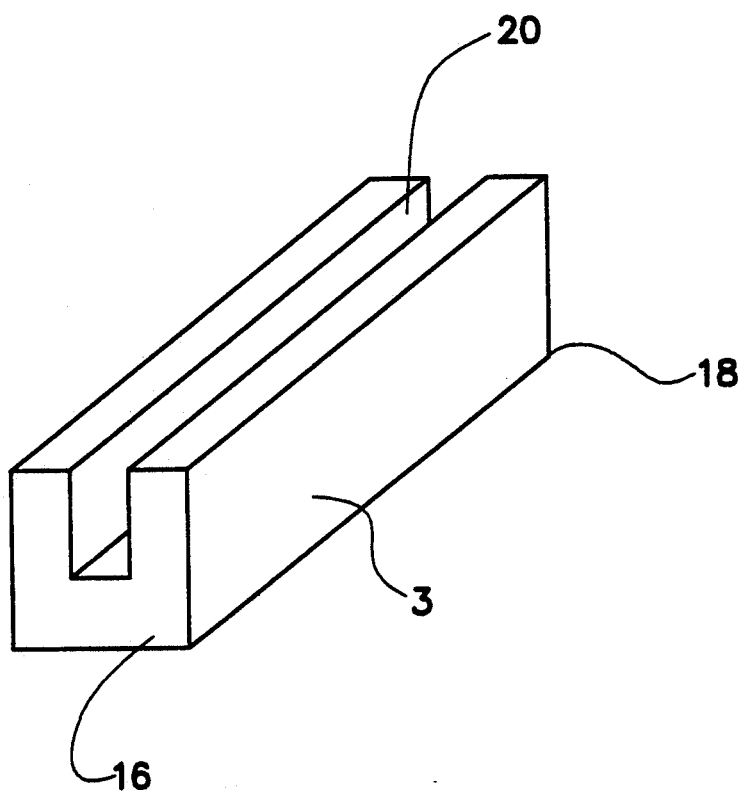
FIG. 1 shows a perspective view of a rectangular block which comprises the primary block of the present invention.
Figure 2:
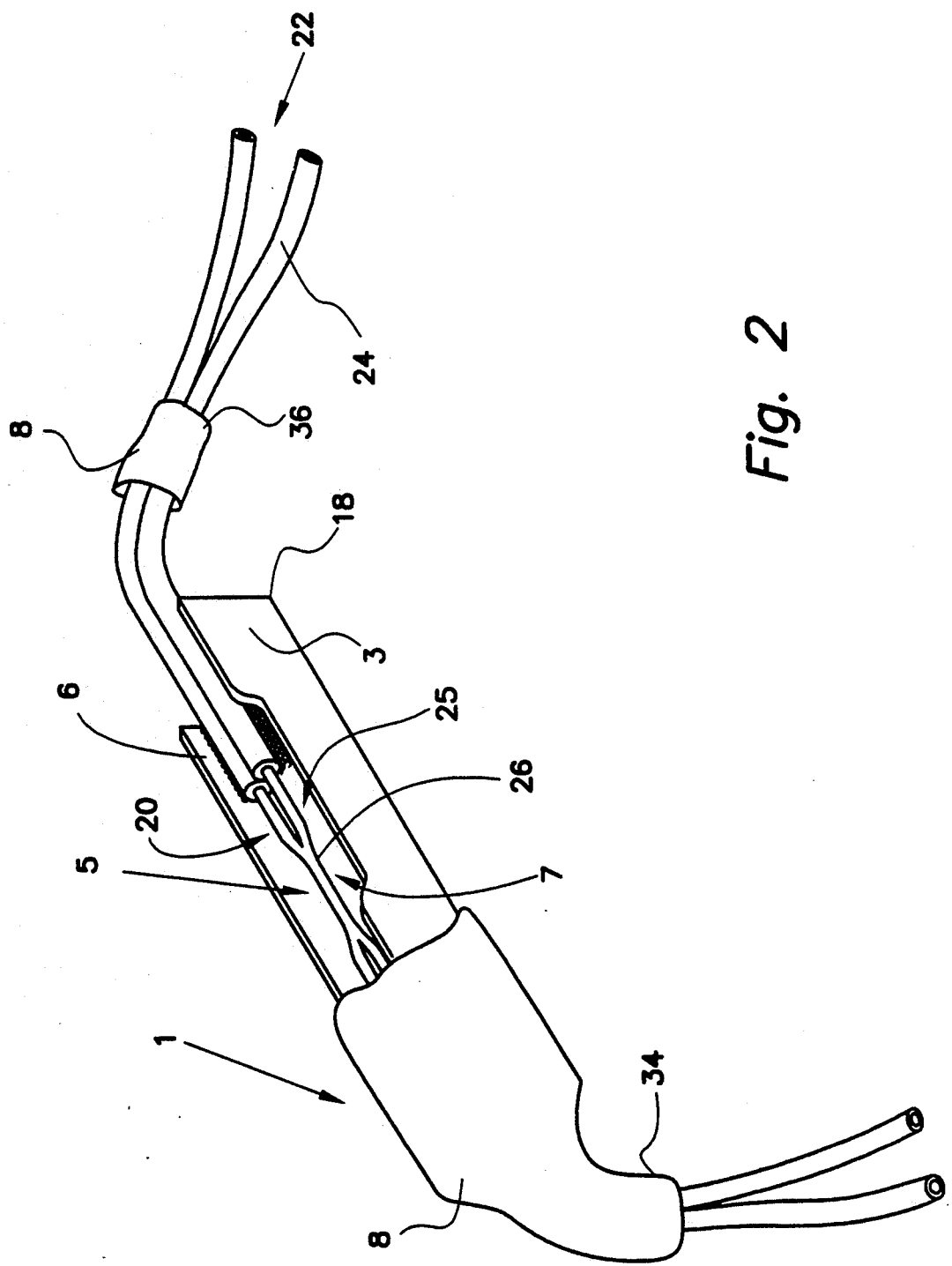
FIG. 2 shows a cut-away perspective view of one embodiment of the invention.

A housing, 1, for an optical fiber directional coupler, 5, having such a coupler therein, is shown in FIGS. 1 and 2. A fused silica rectangular block, 3, having a first end, 16, and a second end, 18, serves as an inner or primary protective body for optical fiber directional coupler 5. In one example of the invention, the rectangular block 3 is fabricated from fused silica to a length generally ranging between 1.235 and 1.265 inches as measured between ends 16 and 18. The width of the rectangular block may range between 0.09 and 0.10 inches for the same example.

A slot, 20, approximately 0.030 inches in width is provided along the length of the rectangular block 3, and is typically provided by cutting the wall of the rectangular block 3 along its direction of elongation with a diamond saw. Slot 20 provides a receiving space to allow coupler 5 to be conveniently placed therein. Openings, one at each of ends 16 and 18 of rectangular block 3, provide exits for corresponding parts excess portions of optical fibers beyond coupled region part of coupler 5.

Rectangular block 3 is then thoroughly cleaned in an ultrasonic acetone bath followed by multiple rinsings in methanol and distilled water without drying between rinsings, thus removing any contaminants from its surface. Rectangular block 3 is then blown dry with nitrogen gas. Rectangular block 3, now clean, is immediately used in forming a housing 1 for coupler 5.

Coupler 5 includes two polarization maintaining optical fibers, 22, each generally clad with a polymer jacket, 24, and each having a portion thereof removed near a region where the pair of optical fibers 22 are joined to form a jacketless region 25. The joining of the pair of fibers 22 by fusing and tapering results in a coupled portion, 26, having a first excess portion of this pair of polarization optical fibers 22 and a second excess portion of these fibers extending from opposite sides of coupled portion 26. The excess portion of polarization maintaining fibers 22, in extending from the coupled portion 26, pass through the corresponding hole or opening located at ends 16 and 18 of rectangular block 3. Coupled portion 26 is positioned in rectangular block 3 so as to avoid contact with the block itself.

An epoxy adhesive is first wicked into open ends 16 and 18 of rectangular block 3 between block 3 and coupler 5 until this epoxy adhesive fills these openings and covers jacket 24 of fibers 22 to within 1 mm of jacketless region 25 of fibers 22 extending from coupled portion 26. This epoxy is then cured in ultraviolet radiation of 315 nanometer wavelength for approximately 20 minutes, and then further cured in infrared radiation at 100° C. for one hour. The epoxy adhesive then completes curing at room temperature for 24 hours. As a result, coupler 5 is suspended by hardened epoxy plugs, 6, between coupler 5 and rectangular block 3. Epoxy plugs 6 are located in the slot 20 such that there is no direct contact between coupler 5 and rectangular block 3. The optical fiber portions extending from coupled portion 26 and passing ends 16 and 18 of block 3 are therefore fixedly supported by epoxy adhesive plugs 6 where they emerge from rectangular block 3. A satisfactory material for epoxy adhesive 6 is designated ELC 4481, available from Electro-Lite Corporation of Danbury, Conn.

The region between coupled portion 26, rectangular block 3 and between the epoxy suspension plugs 6, is substantially filled with a clear silicone material, 7, as a material for mechanically supporting coupled portion 26. Silicone material 7 is cured at room temperature for 24 hours. This support material, being resilient, supports coupled portion 26 so as to prevent undue excursions thereof and to dampen whatever motion is imparted thereto during vibration or shocks thereto. Next, rectangular block 3, with coupler 5 housed therein, is temperature cycled eight times from −55° C. to 90° C. The coupler is then tested to determine the excess loss and the extinction ratio resulting, both prior to completing the packaging process.

Coupled portion 26, being fused quartz, has an index of refraction of approximately 1.45. Silicone support material 7, being in contact with coupled portion 26, should have an index of refraction less than 1.45 so as to maintain total internal reflection of the fiber to avoid an undue insertion loss. A satisfactory material for clear silicone material 7 having an index of refraction of approximately 1.42 is designated Dow Corning® 93-500 Space-Grade Encapsulant, available from Dow Corning Corporation of Midland, Mich.

A heat shrinkable polyolefin tubing, 8, having a first end, 34, and a second end, 36, serves as an outer, or secondary, protective body for coupler 5. Prior to applying heat, heat shrinkable tube 8, has an interior bore or cavity with a diameter slightly larger than the width and height of rectangular block 3, is cut by a standard tube cutting means to a length as measured between its ends 34 and 36 which exceeds the length of rectangular block 3 so as to provide sleeves for fibers 22 at ends 34 and 36. An opening or hole at each end of heat shrinkable tube 8 provides access from the exterior to an interior hollow portion or cavity in heat shrinkable tube 8, allowing rectangular block 3 to be positioned conveniently therein. Rectangular block 3 is positioned within the bore or cavity of heat shrinkable tube 8 prior to the application of heat.

Figure 3:
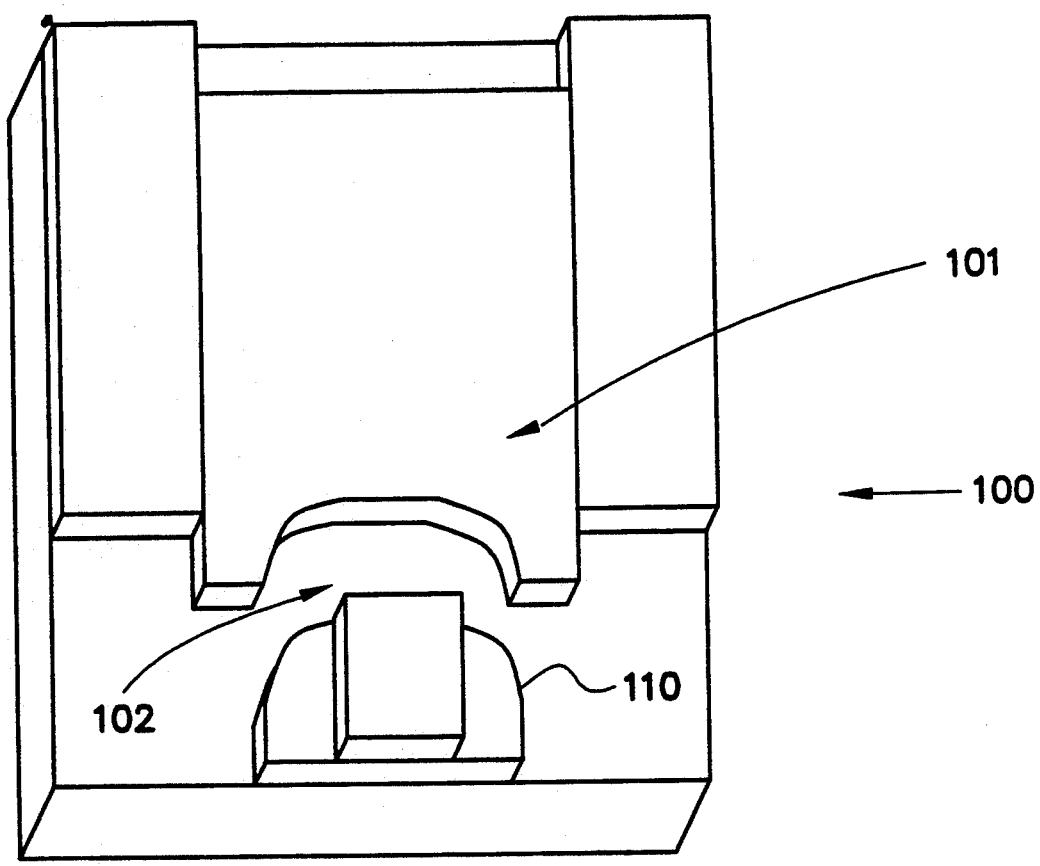
FIG. 3 shows a tool for applying heat shrinkable tubing.

The heat shrinkable tubing 8 may advantageously be a clear heat shrinkable tubing meeting, for example, a standard such as military specification MIL-I23053/5B specification. The heat shrinkable tubing is processed in a well known manner. One example of such heat shrinkable tubing is called Thermalfit SFR which is available from Raychem Corporation, Menlow Park, Calif. A simple tool, such as, for example, tool 100 shown in FIG. 3 may be used to hold the optical coupler assembly in place prior to applying heat to shrink the tubing 8. Such a tool may have a movable block 101 and a space for the coupler 102. The tool advantageously includes a receiving or stationary block 110 wherein the movable block 101 and the receiving block 110 are suitably formed to allow the optical coupler housing to be formed to a pre-determined determined shape. The shape into which the optical coupler housing is formed depends upon the end use of the optical coupler assembly. In this example, the optical coupler housing is formed to have generally rounded shoulders at the ends extending beyond the length of the rectangular block 3.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A housing for an optical fiber directional coupler formed of a plurality of optical fibers having a coupled portion at which electromagnetic waves can be coupled therebetween and at least one excess portion of an optical fiber extending beyond said coupled portion, said housing comprising:
(a) a primary protective body having a receiving slot therein, said coupled portion of said coupler to be housed being positioned in said receiving slot;
(b) suspension means for suspending said coupled portion in said receiving slot defining a space between said coupled portion and said protective body;
(c) a support material at least partially about said coupled portion of said coupler and which extends in said space between said coupled portion and said primary protective body, said support material being resilient and having an index of refraction less than that of said coupled portion; and
(d) a jacket means comprised of a shrinkable material for encompassing said primary protective body, said jacket means including a heat shrinkable tube, said tube having an excess length which exceeds a length of said primary protective body, further wherein said plurality of optical fibers include first and second ends extending from opposite ends of said receiving slot of said primary protective body, said excess length of tube forming first and second sleeves for said first and second ends, respectively, after said tube is heated.

2. The apparatus of claim 1 wherein said optical fibers have a protective jacket thereon.

3. The apparatus of claim 2 wherein a portion of the protective jacket is removed from each of said optical fibers forming a jacketless region.

4. The apparatus of claim 3 wherein said jacketless region of at least two optical fibers are coupled to form said coupled portion.

5. The apparatus of claim 4 wherein said coupled portion has a first excess portion and a second excess portion of optical fiber oppositely extending beyond said coupled portion.

6. The apparatus of claim 5 wherein said suspension means includes means for fixedly holding a part of said first excess portion near a first location where said first excess portion emerges from said primary protective body, and means for fixedly holding a part of said second excess portion near a second location where said second excess portion emerges from said coupled portion, prohibiting contact between said coupled portion and said primary protective body.

7. The apparatus of claim 6 wherein said suspension means comprises an epoxy adhesive.

8. The apparatus of claim 1 wherein said suspension means includes means for fixedly holding a part of said excess portion in said receiving slot near a location where said excess portion emerges from said primary protective body, said suspension means being positioned between said location of emergence of said excess portion and said support material.

9. The apparatus of claim 8 wherein said suspension means comprises an epoxy adhesive.

10. The apparatus of claim 1 wherein said primary protective body comprises a fused silica rectangular block.

11. The apparatus of claim 10 wherein said receiving slot comprises a wall portion removed along the length of said rectangular block.

12. The apparatus of claim 1 wherein said support material substantially fills said receiving slot surrounding said coupler.

13. The apparatus of claim 1 wherein said support material comprises a silicone material.

14. The apparatus of claim 1 wherein said heat shrinkable tubing is substantially comprised of polyolefin tubing.

* * * * *